US011775057B1

(12) United States Patent
Jadidian (10) Patent No.: US 11,775,057 B1
(45) Date of Patent: Oct. 3, 2023

(54) HEAD-MOUNTED DISPLAY OPERATION BASED ON FACE TRACKING

(71) Applicant: Microsoft Technology Licensing, LLC, Redmond, WA (US)

(72) Inventor: Jouya Jadidian, Los Gatos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/804,075

(22) Filed: May 25, 2022

(51) Int. Cl.
*G06F 3/01* (2006.01)
*G06F 21/32* (2013.01)
*G06N 20/00* (2019.01)

(52) U.S. Cl.
CPC .............. *G06F 3/012* (2013.01); *G06F 3/013* (2013.01); *G06F 3/017* (2013.01); *G06F 21/32* (2013.01); *G06N 20/00* (2019.01)

(58) Field of Classification Search
CPC .......... G06F 3/012; G06F 3/013; G06F 3/017; G06F 21/32; G06N 20/00
See application file for complete search history.

(56) References Cited

U.S. PATENT DOCUMENTS

| 5,012,206 A | 4/1991 | Tigges |
| 9,747,072 B2* | 8/2017 | Noble .................. G06F 1/1684 |
| 10,564,717 B1 | 2/2020 | Shahmohammadi et al. |
| 10,635,179 B2 | 4/2020 | Shahmohammadi |
| 10,770,035 B2* | 9/2020 | Giusti .................. H04M 1/724 |
| 10,877,558 B1 | 12/2020 | Zhao |
| 11,481,031 B1 | 10/2022 | Anderson et al. |
| 2009/0219039 A1 | 9/2009 | Fasshauer |
| 2013/0106681 A1* | 5/2013 | Eskilsson ........... G02B 27/0172 345/156 |
| 2014/0104143 A1* | 4/2014 | Benson ................ G02B 27/017 345/8 |
| 2014/0145914 A1 | 5/2014 | Latta et al. |
| 2019/0028635 A1 | 1/2019 | Inami |

(Continued)

FOREIGN PATENT DOCUMENTS

EP 0998659 A1 5/2000

OTHER PUBLICATIONS

Alanis, et al., "3D Gesture Recognition Through RF Sensing", In Technical Report MSR-TR-2014-81, Jun. 2014, 14 Pages.

(Continued)

*Primary Examiner* — Mihir K Rayan
(74) *Attorney, Agent, or Firm* — Alleman Hall Creasman & Tuttle LLP (57) ABSTRACT

A method for operating a head-mounted display device is presented. An RF face tracking system is operated at a first, lower power level. Based at least on an output of the RF face tracking system while operating at the first, lower power level, a first likelihood is determined that the head-mounted display device is positioned on a head of a user. If the first likelihood is greater than a first confidence threshold, the RF face tracking system is operated at a second, higher power level. A second likelihood that the head-mounted display device is positioned on the head of the user is determined based at least on an output of the RF face tracking system while operating at the second, higher power level. If the second likelihood is greater than a second confidence threshold, an eye-tracking system of the head-mounted display device is activated.

20 Claims, 5 Drawing Sheets

(56) References Cited

U.S. PATENT DOCUMENTS

| | | | |
|---|---|---|---|
| 2019/0138087 A1* | 5/2019 | Tokubo | G06F 3/012 |
| 2019/0212822 A1 | 7/2019 | Keller et al. | |
| 2020/0125158 A1* | 4/2020 | Giusti | G01S 13/04 |
| 2020/0382717 A1 | 12/2020 | Chiu et al. | |
| 2021/0385379 A1 | 12/2021 | Smith et al. | |

OTHER PUBLICATIONS

U.S. Appl. No. 17/804,078, filed May 25, 2022.
"Notice of Allowance Issued in U.S. Appl. No. 17/804,078", dated Dec. 5, 2022, 9 Pages.
"Notice of Allowance Issued in U.S. Appl. No. 17/804,078", dated Mar. 24, 2023, 8 Pages.
"International Search Report and Written Openion Issued in PCT Application No. PCT/US2022/049928", dated Mar. 27, 2023, 13 Pages.
"International Search Report and Written Opinion Issued in PCT Application No. PCT/US23/011098", dated Mar. 31, 2023, 12 Pages.
"International Search Report and Written Opinion Issued in PCT Application No. PCT/US22/028879", dated Aug. 9, 2022, 14 Pages.

* cited by examiner

HEAD-MOUNTED DISPLAY OPERATION BASED ON FACE TRACKING

BACKGROUND

Multi-functional electronic devices often attempt to find a balance between quick activation of features when a user engages the device, with corresponding de-activation of features when they are not being used, to prolong battery life. The decision-making process in activating features must balance false positives, false negatives, and latency to generate a user-friendly device interface that seems natural during normal use cases.

Transitioning a device between off or standby and fully functional (e.g., cycling between power states) requires the device to accurately determine the presence of a user without being so sensitive to movement as to register excessive battery-draining false positive recognitions. For the sake of the battery, the device preferably will have a minimal power footprint while in standby, while also being able to quickly activate essential sensors and functions to recognize and authenticate a user.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method for operating a head-mounted display device is presented. An RF face tracking system is operated at a first, lower power level. Based at least on an output of the RF face tracking system while operating at the first, lower power level, a first likelihood is determined that the head-mounted display device is positioned on a head of a user. If the first likelihood is greater than a first confidence threshold, the RF face tracking system is operated at a second, higher power level. A second likelihood that the head-mounted display device is positioned on the head of the user is determined based at least on an output of the RF face tracking system while operating at the second, higher power level. If the second likelihood is greater than a second confidence threshold, an eye-tracking system of the head-mounted display device is activated.

DETAILED DESCRIPTION

A smooth user interface for a head-mounted display (HMD) device would preferably not require the user to put the HMD device on, press a button, and wait for the device to boot up while the user is wearing it. Rather, the user may pick up the HMD device, put it on, and recognize that the device functions are ready to go just before or right when the user puts it on their face. The HMD device may then greet and authenticate the user, allowing the user to enter a virtual reality (VR) or augmented reality (AR) domain with their avatar and/or virtual objects positioned correctly, so the user feels like the augmented content has been there all the time. The user simply needed to put the HMD device on to be able to see them.

Figure 1A:
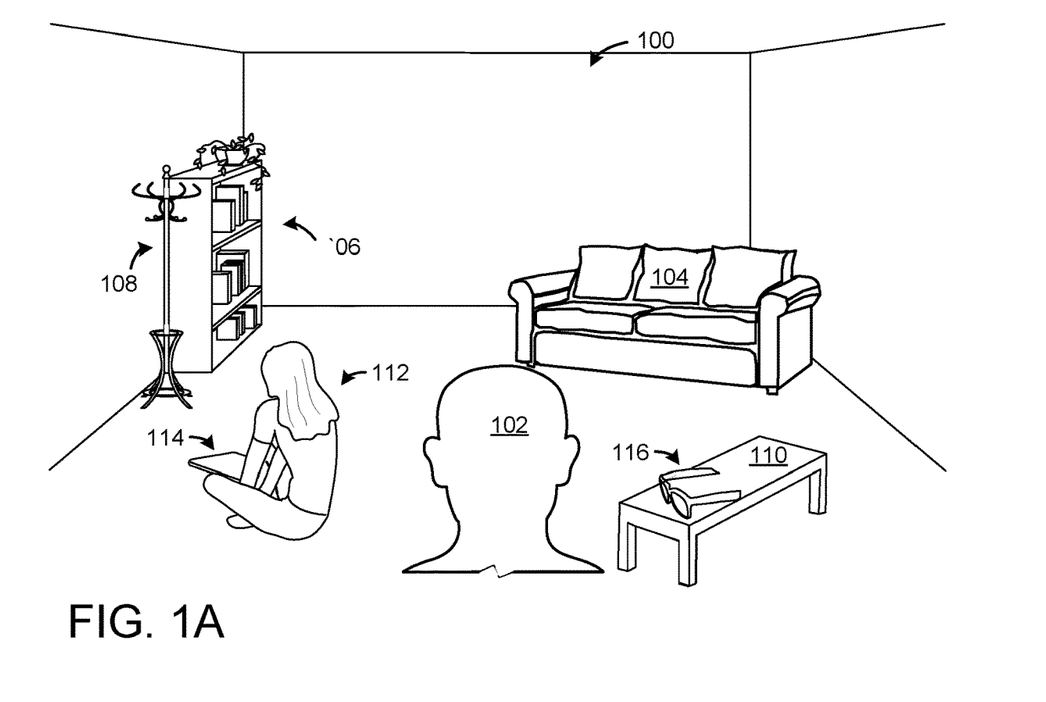
FIG. 1A illustrates a user in an environment preparing to put on a head-mounted display device.

FIG. 1A shows an example use environment 100, wherein a first user 102 is viewing real-world objects, such as couch 104, bookshelf 106, hat rack 108, and table 110. Second user 112 is also positioned within environment 100, viewing content on a tablet computing device 114. An HMD device 116 is positioned on table 110, but is currently turned off.

Figure 1B:
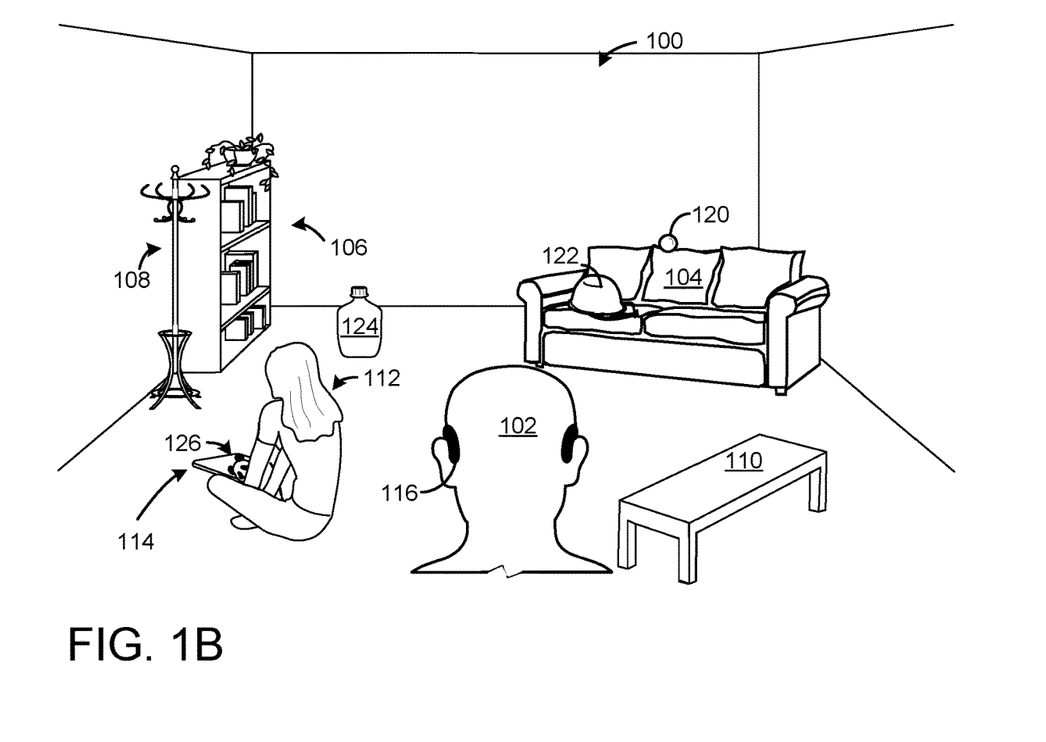
FIG. 1B illustrates the user of FIG. 1A viewing the environment through the head-mounted display device.

In one use case scenario, first user 102 picks up and puts on HMD device 116. As shown in FIG. 1B, in the time it took user 102 to put on HMD device 116, HMD device 116 both turned on and authenticated first user 102. First user 102 is thus instantly immersed in an augmented reality environment, able to view virtual objects, such as ball 120, hat 122, and jug 124 alongside real-world objects 104, 106, 108, 110, etc. Further, an avatar 126 (in the form of a virtual panda) is generated for first user 102. Avatar 126 may mimic facial expressions, speech, etc. of first user 102, and may be presented to other users of other devices, such as second user 112 via tablet computing device 114.

Many consumer devices, such as phones, tablets, etc. use one or more inertial measurement units (IMUs) to detect differential motion and/or incremental motion of the device to determine that the device is moving, and thus trigger the activation of an initial set of features (e.g., turning on a display). IMUs may be operated in a very low power state where only changes are reported when the device is otherwise asleep. This allows features such as raise-to-wake the device. For devices with capacitive or other touch sensors, the IMU output may be combined with touch sensing to confirm that the device is moving due to human interaction, and in some scenarios to more accurately classify which features the user may want activated initially.

However, phones often run a significant number of functions in the background. There may be audio playing through speakers, applications updating, communications systems sending or receiving data, etc. As such, it may only be the display that is turned off after a period of inactivity, and thus only the display need be turned back on responsive to user-device interaction.

HMD devices on the other hand, are generally configured to perform minimal functions when not being worn, such as background rendering and updating local information (spatial position, network, peripheral device information). Unlike for phones, very little is downloaded to the HMD device in a rest mode, the speakers are turned off, and other power consumptive functions are disabled. Maintenance activities are generally performed when the HMD device is charging, such as connected to a case or a docking station. In this way, HMD devices are more similar to watches and other wearable devices, performing relatively few functions when not being worn.

Most watches determine if they are being worn using optical (e.g., Vertical cavity surface emitting lasers (VC-SEL), avalanche photodiodes (APDs)) and/or capacitive sensors that allow the watch to determine if it is next to a surface that has skin-like properties. However such sensors are prone to false-positive determinations of status. Users that put their active watch in their pocket may find the battery drained within hours. The watch may turn on and off periodically as objects are mistaken for the skin of the wrist. Using such sensors to activate an HMD device could result in the display and speakers being turned on when the HMD device is simply picked up and held, whether or not the user puts the HMD device on their head. This may be both power consumptive and socially unacceptable. IMUs present similar challenges. Optical sensors have been tried to detect skin. However, a lot of materials can resemble skin, and generate a similar optical reaction.

Historically, HMD device wear detection has been facilitated though cameras deployed for hand tracking (outward facing) and headtracking (inward facing). However, when waking the HMD device from a standby mode, by the time the eye-tracking cameras and associated illumination are turned on and begin to look for the eyes, significant amounts of power are spent. Further, some display functionality us generally needed to help users position the device properly, making false positive detection costly.

In some examples, capacitive sensing devices have been integrated into pads on different places of the device frame that are expected to contact the user's head and face. However, such sensors are quite costly to integrate, requiring new hardware, often with microcontroller requirements in order for the capacitive signals to be processed. Even then, the hands and head have the same differential capacitive value, so the user will often activate the HMD device just by picking it up.

Presence detection (e.g., device wear detection, or on face detection) technology may be used as a replacement for an ON/OFF button. The technology typically needs to meet desired performance metrics for low latency, low false negative detections, and low false positive detections. Further, the detection technology may be preferably implemented as being robust to occlusion, handling, and movements when the device is powered off. Further, the presence detection should be robust to different head and face shapes, as well as all possible facial expressions the user may make when putting the device on.

As such, systems and methods are presented herein where arrays of nearfield or midrange sensors (e.g., RF sensors) are used to detect objects within a few centimeters. The collective outputs of these sensors can be used to detect head and facial features and distinguish them from hands, pockets, backpacks, and other proximal objects. This allows for rapid activation of the device functionality with reduced false positives and false negatives. The device may transition from standby to low and then higher power modes where the user is logged in and authenticated within a brief window of time starting with when the user begins interacting with the device.

In the standby mode, the device may detect human interaction via one or more sensors operating in a low power mode, such as an IMU or a capacitance sensor. This detected interaction may trigger the activation of an RF face tracking system in a first, lower power mode. Based on the output of the RF face tracking system, a first likelihood of the device being positioned on a user's head may be determined and compared to a first threshold. If the first likelihood is greater than the first threshold, the HMD device may operate the RF face tracking system in a second, higher power mode (e.g., activating additional channels, capturing data at a higher frame rate). Based on the output of the RF face tracking system, a second likelihood of the device being positioned on a user's head may be determined and compared to a second threshold. If the second likelihood is greater than the second threshold, the HMD device may activate an eye-tracking system to authenticate the user. Many HMD devices already include RF face tracking, and for such HMD devices this methodology typically will not require additional hardware. By performing wear detection in multiple stages, battery power may be conserved, false positives may be reduced, and false negatives may be kept near zero. Such an approach has significantly lower false positives than for optical and capacitance-based methods, and has significantly lower latency and lower power consumption than eye-tracking approaches. Further, this methodology is robustly sensitive to the human head, reducing false positives that stem from conductive or non-conductive objects placed on or near the HMD device.

Figure 2:
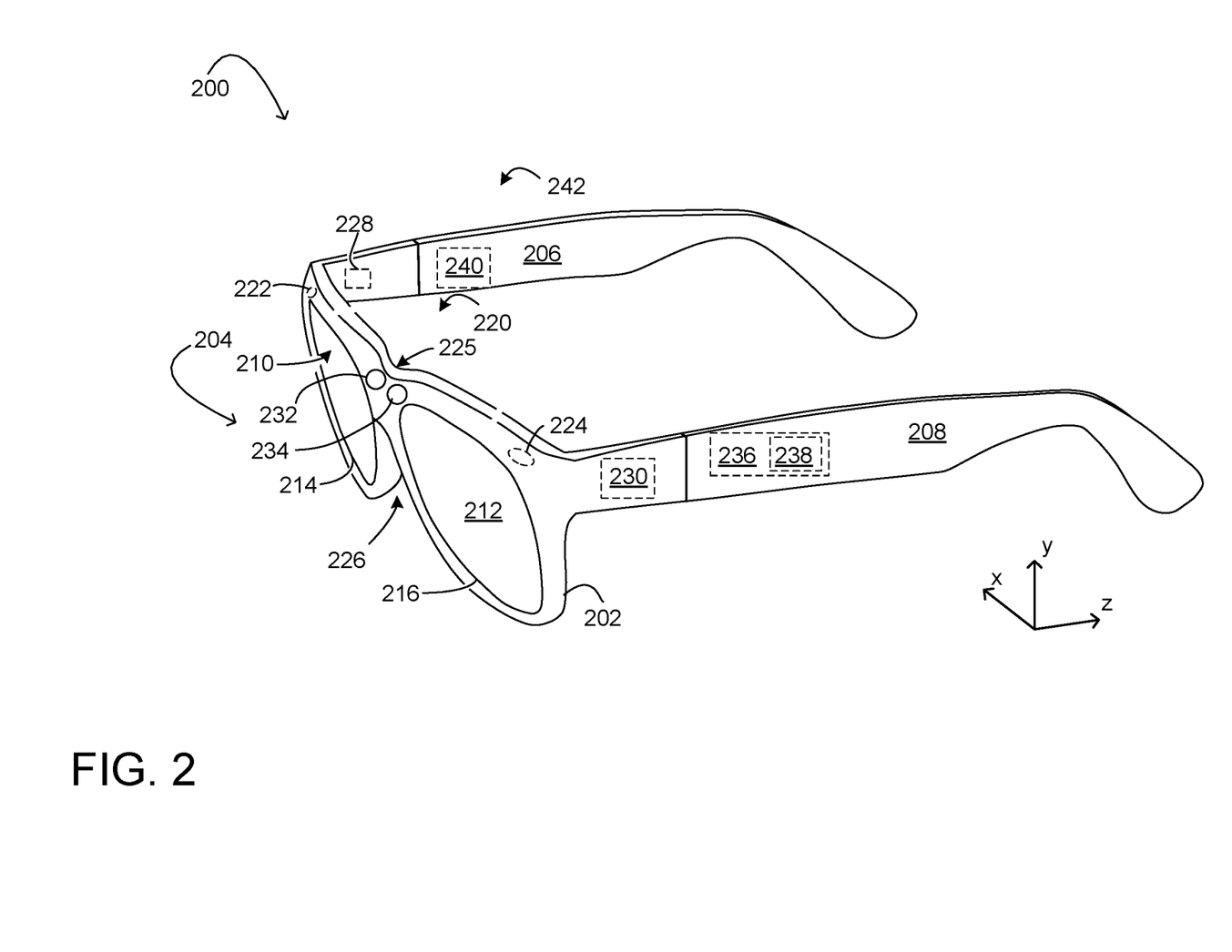
FIG. 2 shows one example of an HMD device.

FIG. 2 shows one example of an HMD device 200. The HMD device 200 includes a frame 202, a display system 204, and temple pieces 206 and 208. Display system 204 includes a first display 210 and a second display 212 supported by frame 202. Each of first display 210 and second display 212 include optical components configured to deliver a projected image to a respective eye of a user. HMD device 200 may be an example of HMD device 116.

Display system 204 of HMD device 200 includes a first display module 214 for generating and displaying a first image via first display 210 and a second display module 216 for generating and displaying a second image via the second display 212, where the first image and the second image combine to form a stereo image. In other examples, a single display module generates and displays first images and second images via first display 210 and second display 212, respectively. Each display module may comprise any suitable display technology, such as a scanned beam projector, a microLED (light emitting diode) panel, a microOLED (organic light emitting diode) panel, or an LCoS (liquid crystal on silicon) panel, as examples. Further, various optics, such as waveguides, one or more lenses, prisms, and/or other optical elements may be used to deliver displayed images to a user's eyes.

HMD device 200 further includes an eye-tracking system 220, comprising at least a first eye-tracking camera 222 and a second eye-tracking camera 224. Data from the eye-tracking system 220 may be used to detect user inputs and to help render displayed images in various examples.

Eye-tracking system 220 may further include a light source 225. Light emitted by light source 225 may reflect off of a user's eye and be detected by first eye-tracking camera 222 and a second eye-tracking camera 224. For example, reflections may be detected as bright spots on a surface of the user's eye. A location of the reflection relative to the user's eye may thus indicate a direction of the user's gaze.

In some examples, the light source and the camera of the eye-tracking system are both located on frame 202 HMD device 200. In some examples, small (e.g., 50 μm) light emitting diodes (LEDs) may be attached to the first display 210 and the second display 212. In other examples, a planar waveguide may be incorporated into the displays or adjacent layers to linearly guide eye-tracking light to one or more desired output location(s).

In this example, first eye-tracking camera 222 and second eye-tracking camera 224 are located at a right edge and a left edge of frame 202, respectively, and are configured to detect eye-tracking light reflected by the user's right eye and left eye, respectively. In other examples, left and right cameras can be located at other locations on frame 202, such as at the nose bridge portion 226 of frame 202. In some examples as described below, the eye-tracking light comprises infrared light and first eye-tracking camera 222 and second eye-tracking camera 224 comprise infrared cameras.

The position of the user's eye(s) may be determined by eye-tracking system 220 and/or gesture recognition machine 228. For example, eye-tracking system 220 may receive image data from first eye-tracking camera 222 and second eye-tracking camera 224, and may evaluate that data using one or more neural networks or other machine-learning devices. As an example, eye-tracking system 220 may determine the position of the user's eye based on the center point of the user's eye, the center point of the user's pupil, and/or gesture recognition machine 228 may estimate the location of the eye based on the location of the head-joint of the virtual skeleton.

HMD device 200 further includes an on-board computing system in the form of a controller 230 configured to render the computerized display imagery via first display module 214 and second display module 216. Controller 230 is configured to send appropriate control signals to first display module 214 to form a right-eye image of a stereoscopic pair of images. Likewise, Controller 230 is configured to send appropriate control signals to second display module 216 to form a left-eye image of the stereoscopic pair of images. Controller 230 may include a logic subsystem and a storage subsystem, as discussed in more detail below with respect to FIG. 5. Operation of HMD device 200 additionally or alternatively may be controlled by one or more remote computing device(s) (e.g., in communication with HMD device 200 via a local area network and/or wide area network).

HMD device 200 may further include various other components, for example an outward facing two-dimensional image camera 232 (e.g. a visible light camera and/or infrared camera), an outward facing depth imaging device 234, and a sensor suite 236. Sensor suite 236 may include one or more IMUs 238 which may include one or more accelerometers, gyroscopes, and/or magnetometers. IMUs 238 may be configured to generate positional information for HMD device 200 that allows for determining a 6OF position of the device in an environment. HMD device 200 may further include a plurality of components that are not shown, including but not limited to speakers, microphones, temperature sensors, touch sensors, biometric sensors, other image sensors, energy-storage components (e.g. battery), a communication facility, a GPS receiver, etc.

HMD device 200 may further include a face tracking system 240 and one or more RF face tracking arrays 242. RF face tracking array 242 may include a plurality of RF channels, each including on or more RF antennas. RF antennas may be placed at any suitable location on HMD device 200, including on frame 202, frame 202, temple pieces 206 and 208, first display 210 and second display 212. A ground reference may be established on the device chassis, such as on an earpiece of temple pieces 206 or 208. As will be described in more detail below, any or all of the plurality of RF antennas may be driven to influence electrical conditions in the vicinity of a human user. This may be done by driving the plurality of RF antennas to emit electromagnetic radiation having any suitable wavelength, amplitude, and/or other suitable characteristics.

Figure 3:
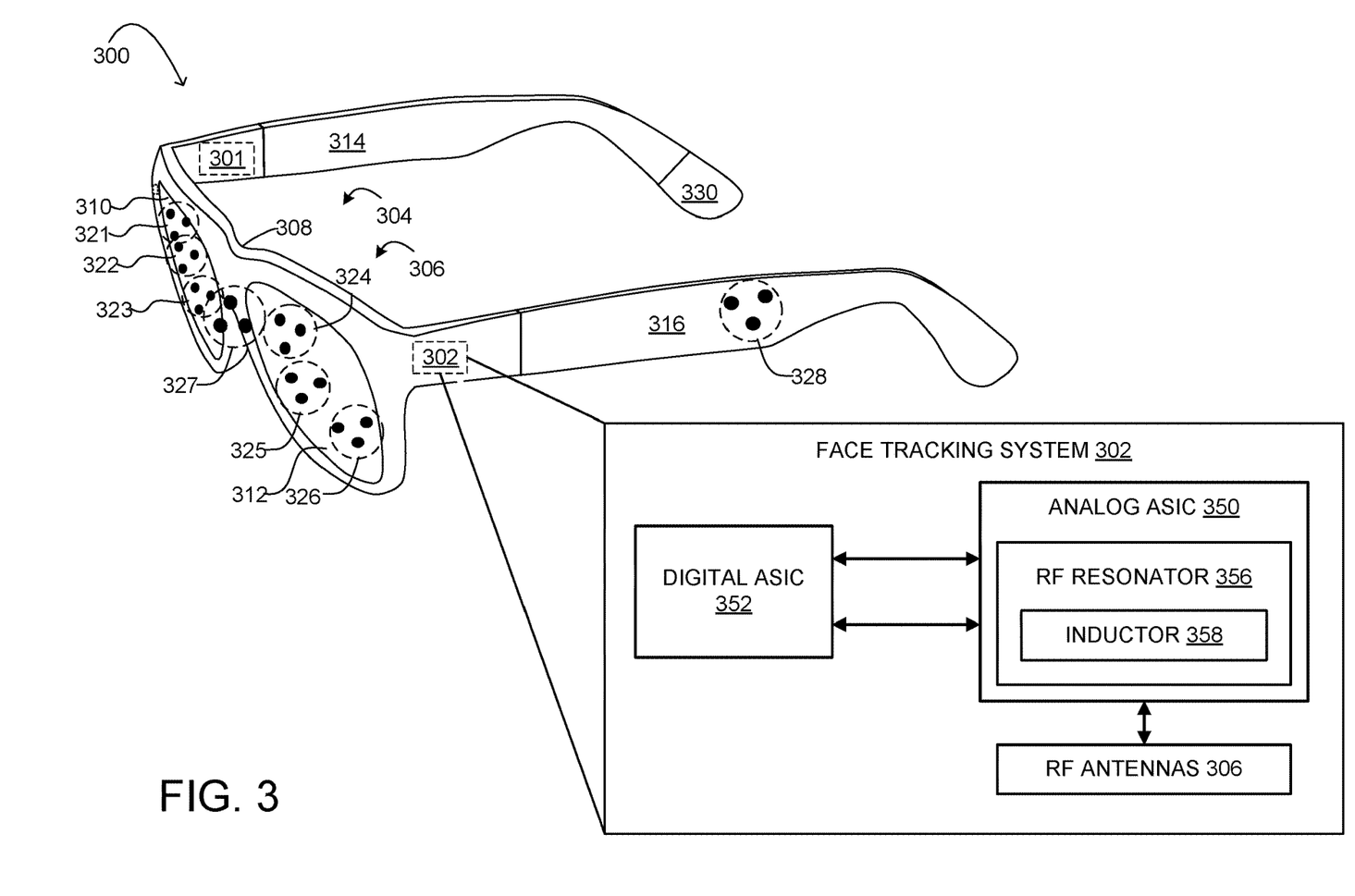
FIG. 3 shows an example of an HMD device including a radio frequency (RF) face tracking system.

A more detailed example of a face tracking machine is shown in FIG. 3. HMD device 300 is shown to comprise controller 301, face tracking system 302 and RF face tracking array 304. HMD device 300 may be an example of HMD devices 116 and 200. Controller 301 may be an example of controller 230. Face tracking system 302 may be an example of face tracking system 240, and RF face tracking array 304 may be an example of RF face tracking array 242. HMD device 300 is shown in simplified form, but may include some or all of the components and functions described with regard to HMD device 200, as well as additional components and functions that are not described herein.

RF face tracking array 304 includes a plurality of RF antennas 306, represented by black circles disposed along frame 308, display 310 and 312, and temples 314 and 316 of HMD device 300. It will be understood that this is done for the sake of illustration only—in practical examples, a computing device may include and/or interface with any suitable number of RF antennas. The plurality of RF antennas may each have any suitable positions relative to one another, the computing device, and the human user. For example, rather than integrated within a housing of the computing device as is shown in FIG. 1, the plurality of RF antennas may be physically separate from the computing device that classifies the human movement. For example, the RF antennas may be integrated into a wearable accessory that communicates with a separate computing device. Furthermore, the RF antennas may have any suitable appearance, and may or may not be visible to the human user and/or an outside observer.

In this example, RF antennas 306 are grouped into eight example RF channels (321, 322, 323, 324, 325, 326, 327, and 328), illustrated by dashed lines around groups of 3 antennas. However, more or fewer antennas may be included in an RF channel, and the channels need not be comprised of equal numbers of antennae. More (e.g., 16) or fewer (e.g., 4) RF channels may be included. Antenna signals may be determined relative to ground 330—e.g., the device chassis. Ground 330 is shown at the end of temple 314, but any suitable position along the HMD device may be used.

RF signals received via display, outer frame, and nose bridge channels may be processed to look for presence and movement of cheeks, eyebrows, forehead, and nose. RF signals received via channels positioned at the bottom of the temple, for example, may be used to look for the user's ears and the head. Each channel may aggregate two or more antennas, though in some examples, a channel may comprise only a single antenna. Groups of RF channels may be electrically coupled to a common relay, allowing for multiple channels to be activated or deactivated together. As more antennas and/or channels are made to be active, the more sensitive the face tracking machine can be, both in terms of detecting relatively small movements, as well as detecting movements over an increased distance.

Antennas positioned on or within displays 310 and 312 may be configured as relatively transparent wires. High transmission antenna types suitable for use on displays 310 and 312 include nanoweb, (a sub-micron, super conductive metal mesh), ITO, silver flakes, and nanowires. Antennas may be affixed to a substrate, or directly to the display materials, and may be sandwiched within a display or provide on the surface of a display.

Each individual RF antenna 306 may in some cases expose a different part of the human user's body surface to an E-field. For example, one or more RF antennas (e.g., 321-326) may generate an E-field in the vicinity of the user's eyes, while one or more other RF antennas (e.g., 327) may generate an E-field in the vicinity of the nose, and so on to achieve a desired coverage of the user's face. This may enable HMD device 300 to detect movements of the user's face, and classify such movements as predefined movements that serve as inputs to the computing device—e.g., different facial expressions.

For example, as human skin is conductive, proximity of the conductive human skin in a near-field region relative to the plurality of RF antennas may disturb an E-field generated by driving the plurality of RF antennas with drive signals, thereby influencing characteristics of the circuitry at one or more of the plurality of RF antennas. In particular, movement of conductive skin near an RF antenna (e.g., caused by movement of muscles under the skin) may affect the impedance at the RF antenna in a measurable way. This change in electrical conditions at the RF antenna may be useable to derive information relating to the user's movement. For example, a change in the distance between the conductive human skin and the RF antenna may result in a change in the electrical conditions at the antenna—e.g., detectable as a change in voltage. The user's movement may then be classified as one or more predefined human movements (e.g., recognizable gestures or facial expressions) by aggregating and interpreting data collected by the plurality of RF antennas.

In this manner, detected changes in electrical conditions at the plurality of RF antennas from one time frame to another may be used to evaluate movements of the human user between the two time frames. In particular, movement of the human user may change characteristics of a circuit that the user is also part of. As one example, the system may comprise an oscillator having a resonant frequency that is sensitive to changes in parasitic capacitance. In other words, the change in frequency of the oscillator may be caused by a change in capacitive loading at the user's body surface, and this may be affected by movements of the user.

The plurality of RF antennas may continue to expose the surface of the face of the human user to the E-field over a sequence of time frames. For example, the user's eyebrow may have lowered relative to the user's eye and either display 310 or 312. This movement of the human user (e.g., movements of muscles in the user's face) may influence electrical conditions at one or more of the plurality of RF antennas, as discussed above.

Face tracking system 302 may include electronic componentry that may be useable to implement and control a plurality of RF antennas, as described herein. For example, each RF antenna 306 may be communicatively coupled with an application-specific integrated circuit (ASIC) 350. As one non-limiting example, ASIC 350 may be an analog ASIC implemented via a BCD (bipolar-CMOS (complementary metal oxide semiconductor)-DMOS (double diffused metal oxide semiconductor)) process. BCD technology is beneficially more accessible in larger process nodes, while supporting relatively higher voltages associated with a higher Q-factor.

The analog ASIC may be communicatively coupled with a digital ASIC 352, which may use a relatively smaller process for digital blocks, while the analog ASIC is relatively larger to accommodate analog pins for a plurality of RF sensing channels. For example, the digital ASIC may use a CMOS process, while the analog ASIC uses a BCD process. The logical elements may use any suitable combination of hardware to drive and scan one or more RF antennas. For example, RF antennas 306 may be communicatively coupled with an RF resonator 356 and an inductor 358. These elements in combination may be useable to generate drive signals that, when supplied to RF antennas, cause the RF antennas to generate an E-field. It will be understood that the RF resonator and inductor may each take any suitable form, and that the specific arrangement of components depicted in FIG. 3 is non-limiting. For instance, in some examples, multiple RF resonators and/or inductors may be used to drive the plurality of RF antennas, even though only one RF resonator and inductor is shown in FIG. 3.

Face tracking system 302 may scan each of the plurality of RF antennas 306 to individually determine ground-relative changes in electrical conditions for each of the plurality of RF antennas relative to a previous time frame. For example, a change in electrical conditions detected at a particular RF antenna of the plurality of RF antennas may be caused by a change in a distance between the particular RF antenna and the human user while the body surface of the human user is exposed to the E-field.

The changes in electrical conditions may be expressed as measured changes in voltage ($\Delta V$) relative to a previous time frame, and/or as a change in current, amplitude, and/or signal phase. The framerate at which the plurality of RF antennas are scanned to determine ground-relative changes in electrical conditions may be independent from a framerate at which virtual imagery is displayed, and/or framerates at which any other computer operations are performed by the computing device. In this example, the changes in electrical conditions are ground-relative changes in electrical conditions, which include detected changes in voltage at each of the plurality of RF antennas relative to electrical ground 330 of HMD device 300. In other examples, however, the electrical conditions at each RF antenna may be compared to any suitable common reference.

As the changes in electrical conditions for each of the plurality of RF antennas are compared to a common reference (e.g., changes in voltage relative to the computing device ground), the plurality of RF antennas may each be driven to generate the E-field using drive signals having a same voltage and phase. In other examples, however, drive signals having different voltage and/or phase may be applied to two or more of the plurality of RF antennas in determining ground-relative changes in electrical conditions.

The specific frequencies used to drive the RF antennas, and the electrical characteristics of the larger circuit as a whole, may be tuned to achieve a desired level of sensitivity and power draw. Specifically, an RF antenna exposing conductive human skin positioned within a near field region relative to the RF antenna to an E-field may cause capacitive loading of the human skin. This may result in flow of complex or real current between the RF antenna and human user depending on the specific circuit design, the frequency of the drive signal, and the proximity of the human skin.

The computing device may determine a plurality of ground-relative changes in electrical conditions, and a plurality of antenna-relative changes in electrical conditions, for any or all of a plurality of RF antennas exposing the body surface of the user to an E-field. The computing device may then derive a plurality of orthogonal parameters from the ground-relative changes in electrical conditions and the antenna-relative changes in electrical conditions. The movement performed by the human user may then be classified as a particular predefined movement.

For example, the computing device may maintain a set of predefined movements, where each predefined movement is associated with a set of predefined orthogonal parameter values known to be consistent with that predefined movement. Thus, upon determining that a particular set of orthogonal parameters match a predefined set of parameters with at least a threshold similarity, then the detected human movement may be classified as the corresponding predefined movement.

For example, the observed set of orthogonal parameters may be used as values for a multi-dimensional feature vector, which may then be compared to similar vectors corresponding to each of the predefined movements via a suitable vector comparison process—e.g., by calculating a Euclidean distance. As another example, the detected parameters may be classified as predefined parameters based at least in part on suitable machine learning (ML) and/or artificial intelligence (AI) techniques. For example, the HMD device may include a machine learning trained-classifier configured to accept a set of orthogonal parameters as an input, and based on the parameters, classify the detected RF antenna output as one of a plurality of predefined movements. The machine learning-trained classifier may be trained in any suitable way and using any suitable training data—e.g., via a suitable combination of supervised and/or unsupervised learning.

Figure 4:
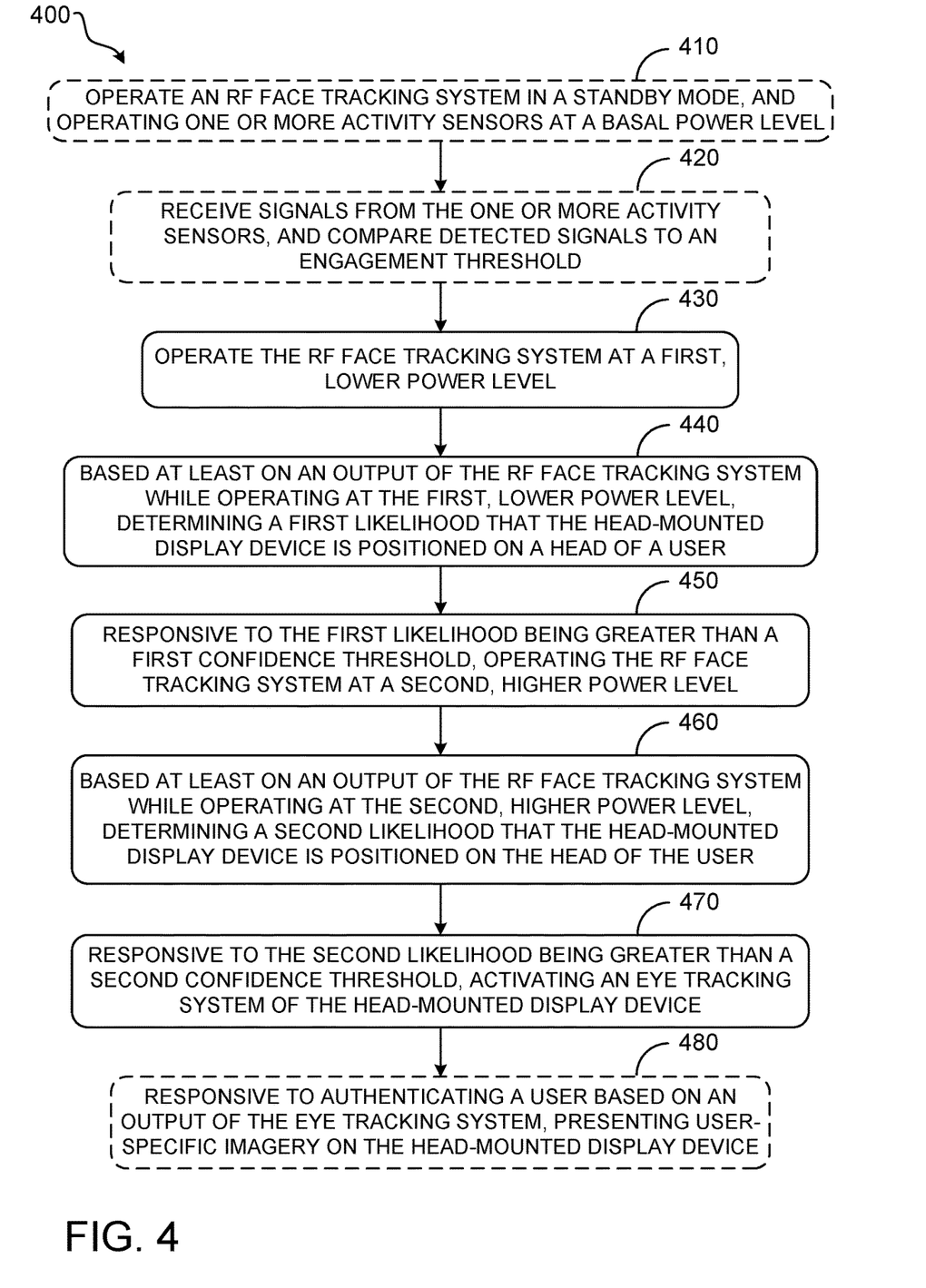
FIG. 4 is a flow diagram for an example method for operating a head-mounted display device that includes an RF face tracking system.

FIG. 4 shows a computer-implemented method 400 for operating an HMD device that includes an RF face tracking system, such as HMD device 300 and RF face tracking system 302, according to an embodiment of the present disclosure. The HMD device may include other sensors outside of the RF face tracking system, such as cameras, IMUS, etc. as described with regard to HMD device 200. Method 400 may be performed at one or more processes of the HMD device, as an example. Additionally or alternatively, aspects of method 400 may be performed by one or more computing devices communicatively coupled to the HMD device.

Method 400 is described as comprising multiple tiers of activation—an optional standby mode, a first, lower power mode, and a second, higher power mode. Additional tiers (e.g., five or six or more) may be implemented in this framework, where each successive tier includes activating additional functionality and may be associated with increased power consumption. As such, the described modes may not feed directly into one another, but entry to one mode may still be based on signals received and processed during a previous mode.

At 410, method 400 may optionally include operating an RF face tracking system in a standby mode, and operating one or more activity sensors at a basal power level. For example, the RF face tracking system may be placed in a standby mode responsive to a period of inactivity increasing above a time-out threshold, when finishing charging on an inductive mat, etc. For example, if the device is left on a table for a threshold duration without substantial movement, the processor may recognize that lack of movement over time, and power down from a lower-power mode to the standby mode.

In such a standby mode, RF Face tracking antennas, eye-tracking cameras, displays, other cameras, etc. may be turned off. Additional sensors may also be deactivated, turned off, or activated in a low power consumptive state. The primary processors of the controller may also be turned off or put in standby mode, as no inherent processing should be occurring. In some examples, an always-on processor of the controller may also be turned off.

One or more activity sensors may be maintained on in a basal power state in order to provide indications to the controller so the controller may look for user engagement or activity. Activity sensors may include one or more IMUs, one or more capacitance sensors, a low energy device pairing subsystem, or any other suitable sensor that may be operated in a low power state and that may be configured to detect a change in device status that may be used to trigger a wake command to the controller and/or the RF face tracking system.

For example, IMUs may be operated in a basal power state that only looks for relative change, and not for absolute movement. Such relative movement may indicate the device is being picked up or otherwise moved by a user. Additionally or alternatively, capacitive sensors may be operated in a low power state to determine whether the device is being touched by skin. In some examples, a low energy beacon or receiver may be left active, in order to detect if a secondary device is in the vicinity (e.g., a user's phone is attempting to pair with the HMD device).

One or more additional sensors may influence whether the engagement sensors are turned on, at what power level, and/or how their signals are processed. For example, the device may be connected to a charging mechanism, placed in a case, positioned with temples folded (e.g., recognizable using hinge or proximity sensors), or otherwise determined to be in a configuration that is not compatible with the device being worn. In such examples, the engagement sensors may be turned off, or may have any signals they generate ignored or overridden.

Continuing at 420, method 400 optionally includes receiving signals from the one or more activity sensors operating at a basal power level, and comparing the detected signals to an engagement threshold. The engagement threshold may be predetermined and/or based on operating conditions. For example, the HMD device may be placed in a backpack or other carrying case such that the IMUs detect random or periodic movement. In such a case, the engagement threshold may be increased, such as to movement vectors that indicate deliberate movement of the HMD device in one or more directions. If the detected signals do not increase above the engagement threshold, the RF face tracking system may be maintained in the standby mode, and the one or more activity sensors may be maintained in the basal power level. If the detected signals do increase above the engagement threshold, method 400 may proceed to 430.

At 430, method 400 includes operating the RF face tracking system at a first, lower power level. For example, the RF face tracking system may operate with a reduced number of channels, with a reduced frame rate, with a reduces by number of antennas per channel, etc. As an example, HMD device 300 includes 8 channels that may be configured to operate at a maximum 30 frames per second (fps). At the first, lower power, fewer than 8 channels may be active, and each active channel may be operating at a frame rate lower than 30 fps. For example, 2 channels may be operating at 2 or 4 fps, and 6 channels will remain in the standby mode. However, other operating parameters may be used with more channels or a single channel, the active channels operating at any suitable frame rate. Such a state may have a significantly reduced power consumption level. In the first, lower power state, the frames may be aggregated, so that each channel only outputs a signal once or twice a second, for example. This may effectively smooth the signals, giving a slightly higher confidence in the signals output during the granular, low power mode, effectively detecting wear candidates. If no signals are detected from the RF face tracking system for a time-out duration, the RF face tracking system may revert to the standby mode.

At 440, method 400 includes, based at least on an output of the RF face tracking system while operating at the first, lower power level, determining a first likelihood that the head-mounted display device is positioned on a head of a user. For example, the RF face tracking system may indicate that the active antennas are positioned within a threshold distance of where they would be if the HMD device were properly worn, but with a low confidence due to the low resolution of the sensors. Additionally or alternatively, signals from the active antennas may indicate that the device is progressively approaching a proper wear position, based on increased signal strength correlating with increased proximity to an object.

The first confidence threshold may be predetermined or may be based on current operating conditions. Thresholds and/or decision boundaries may be generated by the different scenarios utilized during training. One or more classifiers, machine learning models, neural networks, etc. may be trained to recognize when a head-mounted display device is positioned on the head of the user. Features may be extracted from the output of the RF face tracking system and fed to trained models or classifiers. Trained models or classifiers may be previously trained through supervised training based on labeled scenarios of wearing an HMD device, not wearing an HMD device, in the process of putting on an HMD device, etc. Some aspects and characteristics of the wear status may be stored in a cache or user/device history in order to inform future wear status discernment. Deterministic models may be trained to be highly accurate, thus removing the need for a neural network classifier, which may use additional power.

In some examples, additional features may be extracted from any active activity sensors, such as IMUs and provided to the trained models or classifiers. For example, the IMUs may provide an indication of whether the HMD device is parallel to the ground, and thus indicate whether signals from RF antennas on one side of the device may be similar or different than signals from RF antennas on the other side of the device.

The model algorithms described herein may be trained and retrained via machine learning to determine how a particular user prefers to put on the HMD device and what the user expectation is in each particular scenario. The trained model or classifier may receive classifiable features. Each sensor may employ one or more dedicated pre-processes or may collectively employ one or more pre-processes. Signal processing, such as smoothing, may be performed on the raw inputs from the RF antennas and IMUs, etc.

The correlations between extracted features and the different wear scenarios may be calculated and used to generate one or more confidence and/or likelihood scores. For example, decision boundaries between scenarios may be indicated, and a confidence generated based on a distance of the output of a machine learning model and a decision boundary. For example, a classification that is a threshold distance from a decision boundary will be assigned a high confidence, while a classification that is near a decision boundary will be assigned a lower confidence.

Depending on the predetermined or desired latency, the first likelihood may be determined based on as few as one frames. If latency constraints are more relaxed, multiple frames may be analyzed, either in succession or aggregated. In such examples, the RF face tracking system may be operated in an even further reduced power state, even if false positives are increased.

At 450, method 400 includes, responsive to the first likelihood being greater than a first confidence threshold, operating the RF face tracking system at a second, higher power level. In other words as soon as the sensors detect a human, full face and head tracking can be activated, as this stage does not require user authentication.

The first confidence threshold may be set to be extremely generous towards false negatives. In other words, the first confidence threshold may be set to be low enough that even modestly likely wear-candidates are passed through to the second, higher power level. For example, any time HMD device is lifted by a hand of the user, or the HMD device is displaying movements indicating that it is close to a body, or placed in a position where it may be about to be worn, the RF face tracking may be moved to the second, higher power level.

Operating at the second, higher power level may include operating channels that are inactive at the first, lower power level. In examples where the RF face tracking system is operable at a variable frame rate, operating at the second, higher power level may include collecting data at a higher frame rate than at the first, lower power level. For example, full face tracking capability may be activated to that all (e.g., 8 or 16) of the RF channels are operating at full frame rate (e.g., 15, 30, or 60 fps). The RF face tracking system may also be provided with user and/or device history and preferences at this second, higher power level. The second, higher power level may be 10×, 100×, or more power consumptive that the first, lower power level (e.g., 10 mW, 25% duty cycle vs. 0.1 mW, 5% duty cycle).

By combining data from the RF face tracking antennas, the IMUs, and/or other sensors, it can be discerned whether the HMD device is being worn on the head of a user, sitting on a table, or in a user's hand. For example, machine learning models of classifiers may compare extracted features from the combined data to compare the likelihood of different scenarios. For example, the movement and orientation information derived from IMUS may inform which device scenarios to consider when analyzing RF antenna data.

At 460, method 400 includes, based at least on an output of the RF face tracking system while operating at the second, higher power level, determining a second likelihood that the head-mounted display device is positioned on the head of the user. As per the first likelihood, the second likelihood may be predetermined or may be based on current operating conditions. Thresholds and/or decision boundaries may be generated by the different scenarios utilized during training.

The RF face tracking system allows the HMD device to discern whether it is positioned on a head in front of a face. If no head or face is detected for a threshold duration, the RF face tracking system may be returned to the first, lower power level, and/or eventually to a standby level.

Continuing at 470, method 400 includes, responsive to the second likelihood being greater than a second confidence threshold, activating an eye-tracking system of the HMD device. If a face or something that resembles the face is observed with a likelihood greater than the confidence interval, the eye-tracking cameras are turned on. In some examples, the displays may also be turned on. The eye-tracking system then may operate to look for a user's iris, can measure the distance between the pupils and the HMD device, and can then proceed to authentication and login routines.

In general, activating the eye-tracking system includes activating the eye-tracking system at full power and with full functionality. However, in some examples, the eye-tracking system may be initialized at a reduced power and/or reduced functionality. In some examples, activating the eye-tracking system is accompanied by maintaining and/or increasing the level of RF face tracking system. By operating both the eye-tracking system and RF face tracking system at or near full capacity, the accuracy of wear-detection is increased. Latency may be reduced by turning on the core of the always-on processor. As such, as soon as the eye-tracking cameras generate a first image frame, the controller can judge whether or not there are a pair of eyes in the images.

In some examples, activating the eye-tracking system includes normalizing output signals for each of the plurality of channels of the RF face tracking system. For example, normalizing output signals may include setting each channel to a predetermined value for neutral expression. Once the HMD device is positioned on the head, the eye-tracking system is responsible for any device shift measurement and for correcting the neutral expression settings. If the device is shifted on purpose relative to the eyes, or signal drift is detected, the neutral expression value can be reset or adjusted. In this way, the RF face tracking system can be set to mimic the stages of preliminary and high confidence expression detection. Once signal health and relative balance are detected, all channels can be set to their predetermined output value. Such a value may be 0, may be generated from a lookup table, may be user specific, etc. In some examples some channels may be normalized to a different value than other channels, based on known signal strengths, for example.

Responsive to the second likelihood being less than the second confidence threshold, a false positive result may be recorded, and the RF face tracking system may be returned to the first, lower power mode. The first confidence threshold may be adjusted based on a number of false positive results increasing above a threshold. In other words, the first confidence threshold (and the second confidence threshold) may be dynamically adjusted based on false positive results received in a given time period, generally to make the recognition sequence less sensitive to particular signals or device parameters.

Returning to FIG. 4, optionally, at 480, responsive to authenticating a user based on an output of the eye-tracking system, presenting user-specific imagery on the head-mounted display device. Once eye-tracking is activated, proper positioning of the HMD device can be confirmed or disconfirmed. Often, this includes presenting predetermined imagery on the head-mounted display device to instruct the user how to adjust the positioning of the HMD device. At the same time, the eye-tracking machine can perform a suitable iris recognition sequence. In some examples, responsive to authenticating a user, method 400 further includes adjusting an appearance of an avatar of the user based on signals from RF face tracking system.

In some examples, one or more of the first confidence threshold and the second confidence threshold are set based on a predetermined battery consumption parameter. While a false positive result may be undesirable, the overall impact is mostly limited to turning the power level down or off for certain components that were activated as the device moved up a tier. Time-out durations can be set for rolling back a tier, and thresholds can be adjusted when repeated false positives occur. For example, eye-tracking cameras were activated, but did not recognize any eyes, so they are turned back on. Nothing untoward occurs, but some battery power is lost. If the issue resolves, the thresholds and parameters can be returned to baseline.

The device parameters may be set to maintain a threshold battery drain over a set duration—e.g., 10% battery drop within 48 hours when the device is left unattended. If the device is using more power than that due to false positive activations, the confidence thresholds for advancing tiers may be adjusted to reduce those occurrences.

Exiting the full-power mode is generally based on the eye-tracker determining an off-head state, and not the RF face tracker. As soon as the eye-tracking machine determines that the displays have moved away from the eyes, the optical portions of the displays are turned off; not only to save power but for the user experience, as it is undesirable to have any virtual content presented when the HMD device is not in place. Other subsystems of the HMD device may then be turned off based on one or more time-out timers, starting from when the HMD device is moved from the eyes. The RF face tracker is thus not needed to turn the device off but could potentially support the data from the eye-tracker. If the user moves the HMD device to their forehead, e.g., to take a break from viewing content, they may remain authenticated for a duration. However, in situations where the HMD device remains away from their eyes for a longer duration, or is taken off the head completely, the HMD device may return to a standby or lower power mode.

The face tracking system may be configured to learn user characteristics over time, benefitting from data generated during positive and negative detections. Face tracking profiles may be trained for each user's cranial and facial characteristics. As such, the thresholds and confidences for false positives and false negatives will be different for each individual. The more a user interacts and wears a device, the more the face tracking pipeline will learn and improve over time. Head detection can also learn from this user history over time. As an example, if multiple users are sharing a single HMD device, the users who wear the HMD device the most will generate more robust and mature facial tracking profiles, and thus benefit from more specific recognition features, potentially reducing latency and false positives.

Cases where the user is handling the HMD device, but not approaching their head may result in the HMD device remaining in standby mode. For example, the user could be cleaning the display lenses, approaching any antennas embedded within the displays. This action should not trigger full-power mode of the eye-tracking device.

As described above, the occurrence of false negatives is targeted to be as close to zero as possible, to prevent user discouragement, especially in the absence of a power or reset button. As such, the latency may be adjusted rather than the confidence thresholds, to allow the HMD device more time to collect data and to make a more accurate classification of the collected data. Some tradeoff between false positives, battery drain, and latency is needed to maintain false negatives near zero.

RF face detection may be the centerpiece of the solution to that problem. It is harder to fool RF, than IMUs, capacitance sensors, and is not nearly as power consumptive as cameras. RF is also not limited to near field detection, rather RF can collect data at a distance and detect head shape quickly and accurately. By progressively activating RF face detection, high accuracy may be achieved with low latency, without generating false negatives or wasting battery power. The technical effects of implementing such systems and methods thus include a decrease in battery power consumption in mobile devices, and an improvement in human-device interactions, as the rapid, selective activation may allow the user to maintain the cognition of a hidden augmented reality.

In some embodiments, the methods and processes described herein may be tied to a computing system of one or more computing devices. In particular, such methods and processes may be implemented as a computer-application program or service, an application-programming interface (API), a library, and/or other computer-program product.

Figure 5:
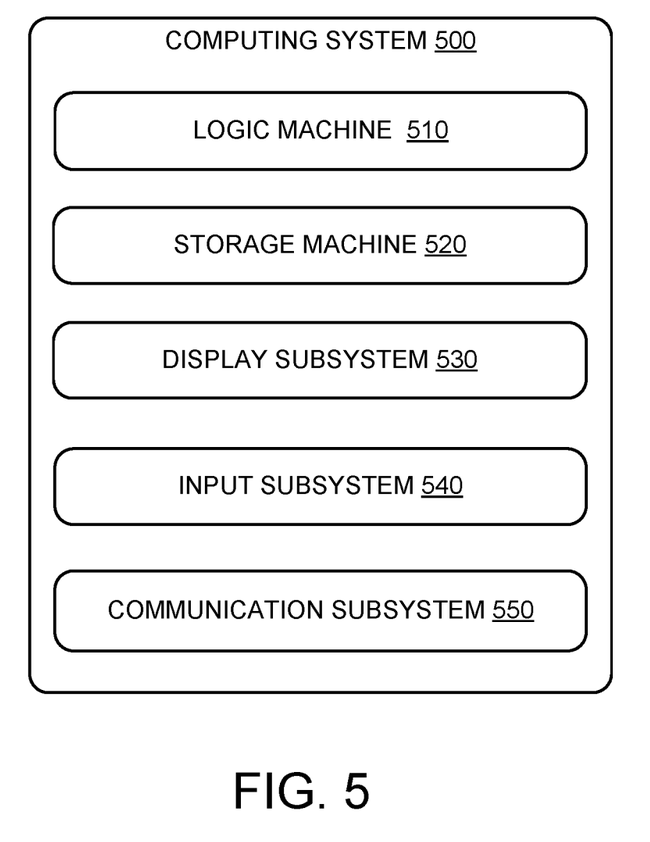
FIG. 5 schematically shows an example computing device.

FIG. 5 schematically shows a non-limiting embodiment of a computing system 500 that can enact one or more of the methods and processes described above. Computing system 500 is shown in simplified form. Computing system 500 may take the form of one or more personal computers, server computers, tablet computers, home-entertainment computers, network computing devices, gaming devices, mobile computing devices, mobile communication devices (e.g., smart phone), and/or other computing devices.

Computing system 500 includes a logic machine 510 and a storage machine 520. Computing system 500 may optionally include a display subsystem 530, input subsystem 540, communication subsystem 550, and/or other components not shown in FIG. 5. For example, head-mounted display devices 116, 200, and 300 may be examples of computing system 500. Controllers 230 and 301 may be examples of logic machine 510. Displays 210, 212, 310, and 312 may be an example of display subsystem 530. Cameras 232 and 234, eye-tracking system 220, and face tracking systems 240 and 302 may be examples of input subsystem 540.

Logic machine 510 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 520 includes one or more physical devices configured to hold instructions executable by the logic machine to implement the methods and processes described herein. When such methods and processes are implemented, the state of storage machine 520 may be transformed—e.g., to hold different data.

Storage machine 520 may include removable and/or built-in devices. Storage machine 520 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 520 may include volatile, nonvolatile, dynamic, static, read/write, read-only, random-access, sequential-access, location-addressable, file-addressable, and/or content-addressable devices.

It will be appreciated that storage machine 520 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 510 and storage machine 520 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 500 implemented to perform a particular function. In some cases, a module, program, or engine may be instantiated via logic machine 510 executing instructions held by storage machine 520. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service," as used herein, is an application program executable across multiple user sessions. A service may be available to one or more system components, programs, and/or other services. In some implementations, a service may run on one or more server-computing devices.

Machine learning models as referenced above may be implemented using any suitable combination of state-of-the-art and/or future machine learning and/or other artificial intelligence techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), unsupervised spatial and/or clustering methods (e.g., nearest neighbor algorithms, topological data analysis, and/or k-means clustering), and/or graphical models (e.g., (hidden) Markov models, Markov random fields, (hidden) conditional random fields, and/or AI knowledge bases).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

When included, display subsystem 530 may be used to present a visual representation of data held by storage machine 520. This visual representation may take the form of a graphical user interface (GUI). As the herein described methods and processes change the data held by the storage machine, and thus transform the state of the storage machine, the state of display subsystem 530 may likewise be transformed to visually represent changes in the underlying data. Display subsystem 530 may include one or more display devices utilizing virtually any type of technology. Such display devices may be combined with logic machine 510 and/or storage machine 520 in a shared enclosure, or such display devices may be peripheral display devices.

When included, input subsystem 540 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 550 may be configured to communicatively couple computing system 500 with one or more other computing devices. Communication subsystem 550 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 500 to send and/or receive messages to and/or from other devices via a network such as the Internet.

In one example, a method for operating a head-mounted display device, comprises operating a radio frequency (RF) face tracking system at a first, lower power level; based at least on an output of the RF face tracking system while operating at the first, lower power level, determining a first likelihood that the head-mounted display device is positioned on a head of a user; responsive to the first likelihood being greater than a first confidence threshold, operating the RF face tracking system at a second, higher power level; based at least on an output of the RF face tracking system while operating at the second, higher power level, determining a second likelihood that the head-mounted display device is positioned on the head of the user; and responsive to the second likelihood being greater than a second confidence threshold, activating an eye-tracking system of the head-mounted display device. In such an example, or any other example, the method additionally or alternatively comprises, responsive to a period of inactivity increasing above a time-out threshold, placing the RF face tracking system in a standby mode, the standby mode having a third, reduced power level, lower than the first, lower power level; and operating one or more activity sensors at a basal power level. In any of the preceding examples, or any other example, the method additionally or alternatively comprises receiving signals from the one or more activity sensors operating at the basal power level; comparing the received signals to an engagement threshold; and responsive to the received signals increasing above the engagement threshold, operating the RF face tracking system at the first, lower power level. In any of the preceding examples, or any other example, the one or more activity sensors additionally or alternatively include one or more inertial measurement units. In any of the preceding examples, or any other example, the RF face tracking system is additionally or alternatively operable at a variable frame rate, and wherein operating at the second, higher power level additionally or alternatively includes collecting data at a higher frame rate than at the first, lower power level. In any of the preceding examples, or any other example, the RF face tracking system additionally or alternatively includes a plurality of channels including one or more antennas, and wherein operating at the second, higher power level additionally or alternatively includes operating channels that are inactive at the first, lower power level. In any of the preceding examples, or any other example, activating the eye-tracking system additionally or alternatively includes normalizing output signals for each of the plurality of channels of the RF face tracking system. In any of the preceding examples, or any other example, normalizing output signals additionally or alternatively includes setting each channel to a predetermined value for neutral expression. In any of the preceding examples, or any other example, the method additionally or alternatively comprises, responsive to the second likelihood being less than the second confidence threshold, recording a false positive result; and returning the RF face tracking system to the first, lower power mode. In any of the preceding examples, or any other example, the method additionally or alternatively comprises adjusting the first confidence threshold based on a number of false positive results increasing above a threshold. In any of the preceding examples, or any other example, the method additionally or alternatively comprises, responsive to authenticating the user based on an output of the eye-tracking system, presenting user-specific imagery on the head-mounted display device. In any of the preceding examples, or any other example, the method additionally or alternatively comprises adjusting an appearance of an avatar of the user based on signals from RF face tracking system. The technical effect of implementing this method is a reduction in consumption of battery resources for a mobile computing device.

In another example, a head-mounted display device comprises a near-eye display system; a radio frequency (RF) face tracking system; an eye-tracking system; and a controller configured to operate in a first mode, wherein the eye-tracking is turned off, the display is turned off, and the RF face tracking system is operating in a first, lower power level; based at least on an output of the RF face tracking system while operating at the first, lower power level, determine a first likelihood that the head-mounted display device is positioned on a head of a user; responsive to the first likelihood being greater than a first confidence threshold, operate the RF face tracking at a second, higher power level; based at least on an output of the RF face tracking system while operating at the second, higher power level, determine a second likelihood that the head-mounted display device is positioned on the head of the user; and responsive to the second likelihood being greater than a second confidence threshold, activate the eye-tracking system. In such an example, or any other example, the head-mounted display device additionally or alternatively comprises one or more inertial measurement units, and wherein the controller is additionally or alternatively configured to, responsive to a period of inactivity increasing above a time-out threshold, place the RF face tracking system in a standby mode, the standby mode having a third, reduced power level, lower than the first, lower power level; and operating the one or more inertial measurement units at a basal power level. In any of the preceding examples, or any other example, the controller is additionally or alternatively configured to receive signals from the one or more inertial measurement units operating at the basal power level; compare the received signals to an engagement threshold; and responsive to the received signals increasing above the engagement threshold, operate the RF face tracking system at the first, lower power level. In any of the preceding examples, or any other example, the RF face tracking system is additionally or alternatively operable at a variable frame rate, and wherein operating at the second, higher power level additionally or alternatively includes collecting data at a higher frame rate than at the first, lower power level. In any of the preceding examples, or any other example, the RF face tracking system additionally or alternatively includes a plurality of channels including one or more antennas, and wherein operating at the second, higher power level additionally or alternatively includes operating channels that are inactive at the first, lower power level. In any of the preceding examples, or any other example, activating the eye-tracking system additionally or alternatively includes normalizing output signals for each of the plurality of channels of the RF face tracking system. In any of the preceding examples, or any other example, the controller is additionally or alternatively configured to, responsive to the second likelihood being greater than the second confidence threshold, activate the near-eye display system. The technical effect of implementing this head-mounted display device is an improvement in human-computer interaction.

In yet another example, a method for operating a head-mounted display device comprises operating in a standby mode, wherein an eye-tracking system is turned off, a display is turned off, a radio frequency (RF) face tracking system is turned off, and one or more inertial measurement units are operating at a basal power level; receiving signals from the one or more inertial measurement units operating at the basal power level; compare the received signals to an engagement threshold; responsive to the received signals increasing above the engagement threshold, operating in a first mode, wherein the eye-tracking system is turned off, the display is turned off, and the RF face tracking system is operating in a first, lower power level; based at least on an output of the RF face tracking system while operating at the first, lower power level, determine a first likelihood that the head-mounted display device is positioned on a head of a user; responsive to the first likelihood being greater than a first confidence threshold, operate the RF face tracking at a second, higher power level; based at least on an output of the RF face tracking system while operating at the second, higher power level, determine a second likelihood that the head-mounted display device is positioned on the head of the user; and responsive to the second likelihood being greater than a second confidence threshold, activate the eye-tracking system. The technical effect of implementing this method is a reduction in consumption of battery resources for a mobile computing device.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for operating a head-mounted display device, comprising:
   operating a radio frequency (RF) face tracking system at a first, lower power level;
   based at least on an output of the RF face tracking system while operating at the first, lower power level, determining a first likelihood that the head-mounted display device is positioned on a head of a user;
   responsive to the first likelihood being greater than a first confidence threshold, operating the RF face tracking system at a second, higher power level;
   based at least on an output of the RF face tracking system while operating at the second, higher power level, determining a second likelihood that the head-mounted display device is positioned on the head of the user; and
   responsive to the second likelihood being greater than a second confidence threshold, activating an eye-tracking system of the head-mounted display device.

2. The method of claim 1, further comprising:
   responsive to a period of inactivity increasing above a time-out threshold, placing the RF face tracking system in a standby mode, the standby mode having a third, reduced power level, lower than the first, lower power level; and
   operating one or more activity sensors at a basal power level.

3. The method of claim 2, further comprising:
   receiving signals from the one or more activity sensors operating at the basal power level;
   comparing the received signals to an engagement threshold; and
   responsive to the received signals increasing above the engagement threshold, operating the RF face tracking system at the first, lower power level.

4. The method of claim 2, wherein the one or more activity sensors include one or more inertial measurement units.

5. The method of claim 1, wherein the RF face tracking system is operable at a variable frame rate, and wherein operating at the second, higher power level includes collecting data at a higher frame rate than at the first, lower power level.

6. The method of claim 1, wherein the RF face tracking system includes a plurality of channels including one or more antennas, and wherein operating at the second, higher power level includes operating channels that are inactive at the first, lower power level.

7. The method of claim 6, wherein activating the eye-tracking system includes normalizing output signals for each of the plurality of channels of the RF face tracking system.

8. The method of claim 7, wherein normalizing output signals includes setting each channel to a predetermined value for neutral expression.

9. The method of claim 1, further comprising:
responsive to the second likelihood being less than the second confidence threshold, recording a false positive result; and
returning the RF face tracking system to the first, lower power mode.

10. The method of claim 9, further comprising:
adjusting the first confidence threshold based on a number of false positive results increasing above a threshold.

11. The method of claim 1, further comprising:
responsive to authenticating the user based on an output of the eye-tracking system, presenting user-specific imagery on the head-mounted display device.

12. The method of claim 11, further comprising:
adjusting an appearance of an avatar of the user based on signals from RF face tracking system.

13. A head-mounted display device, comprising:
a near-eye display system;
a radio frequency (RF) face tracking system;
an eye-tracking system; and
a controller configured to:
  operate in a first mode, wherein the eye-tracking is turned off, the display is turned off, and the RF face tracking system is operating in a first, lower power level;
  based at least on an output of the RF face tracking system while operating at the first, lower power level, determine a first likelihood that the head-mounted display device is positioned on a head of a user;
  responsive to the first likelihood being greater than a first confidence threshold, operate the RF face tracking at a second, higher power level;
  based at least on an output of the RF face tracking system while operating at the second, higher power level, determine a second likelihood that the head-mounted display device is positioned on the head of the user; and
  responsive to the second likelihood being greater than a second confidence threshold, activate the eye-tracking system.

14. The head-mounted display device of claim 13, further comprising:
one or more inertial measurement units, and wherein the controller is further configured to:
  responsive to a period of inactivity increasing above a time-out threshold, place the RF face tracking system in a standby mode, the standby mode having a third, reduced power level, lower than the first, lower power level; and
  operating the one or more inertial measurement units at a basal power level.

15. The head-mounted display device of claim 14, wherein the controller is further configured to:
receive signals from the one or more inertial measurement units operating at the basal power level;
compare the received signals to an engagement threshold; and
responsive to the received signals increasing above the engagement threshold, operate the RF face tracking system at the first, lower power level.

16. The head-mounted display device of claim 13, wherein the RF face tracking system is operable at a variable frame rate, and wherein operating at the second, higher power level includes collecting data at a higher frame rate than at the first, lower power level.

17. The head-mounted display device of claim 13, wherein the RF face tracking system includes a plurality of channels including one or more antennas, and wherein operating at the second, higher power level includes operating channels that are inactive at the first, lower power level.

18. The head-mounted display device of claim 17, wherein activating the eye-tracking system includes normalizing output signals for each of the plurality of channels of the RF face tracking system.

19. The head-mounted display device of claim 13, wherein the controller is further configured to:
responsive to the second likelihood being greater than the second confidence threshold, activate the near-eye display system.

20. A method for operating a head-mounted display device, comprising:
operating in a standby mode, wherein an eye-tracking system is turned off, a display is turned off, a radio frequency (RF) face tracking system is turned off, and one or more inertial measurement units are operating at a basal power level;
receiving signals from the one or more inertial measurement units operating at the basal power level;
compare the received signals to an engagement threshold;
responsive to the received signals increasing above the engagement threshold, operating in a first mode, wherein the eye-tracking system is turned off, the display is turned off, and the RF face tracking system is operating in a first, lower power level;
based at least on an output of the RF face tracking system while operating at the first, lower power level, determine a first likelihood that the head-mounted display device is positioned on a head of a user;
responsive to the first likelihood being greater than a first confidence threshold, operate the RF face tracking at a second, higher power level;
based at least on an output of the RF face tracking system while operating at the second, higher power level, determine a second likelihood that the head-mounted display device is positioned on the head of the user; and
responsive to the second likelihood being greater than a second confidence threshold, activate the eye-tracking system.

* * * * *